Figure 11:
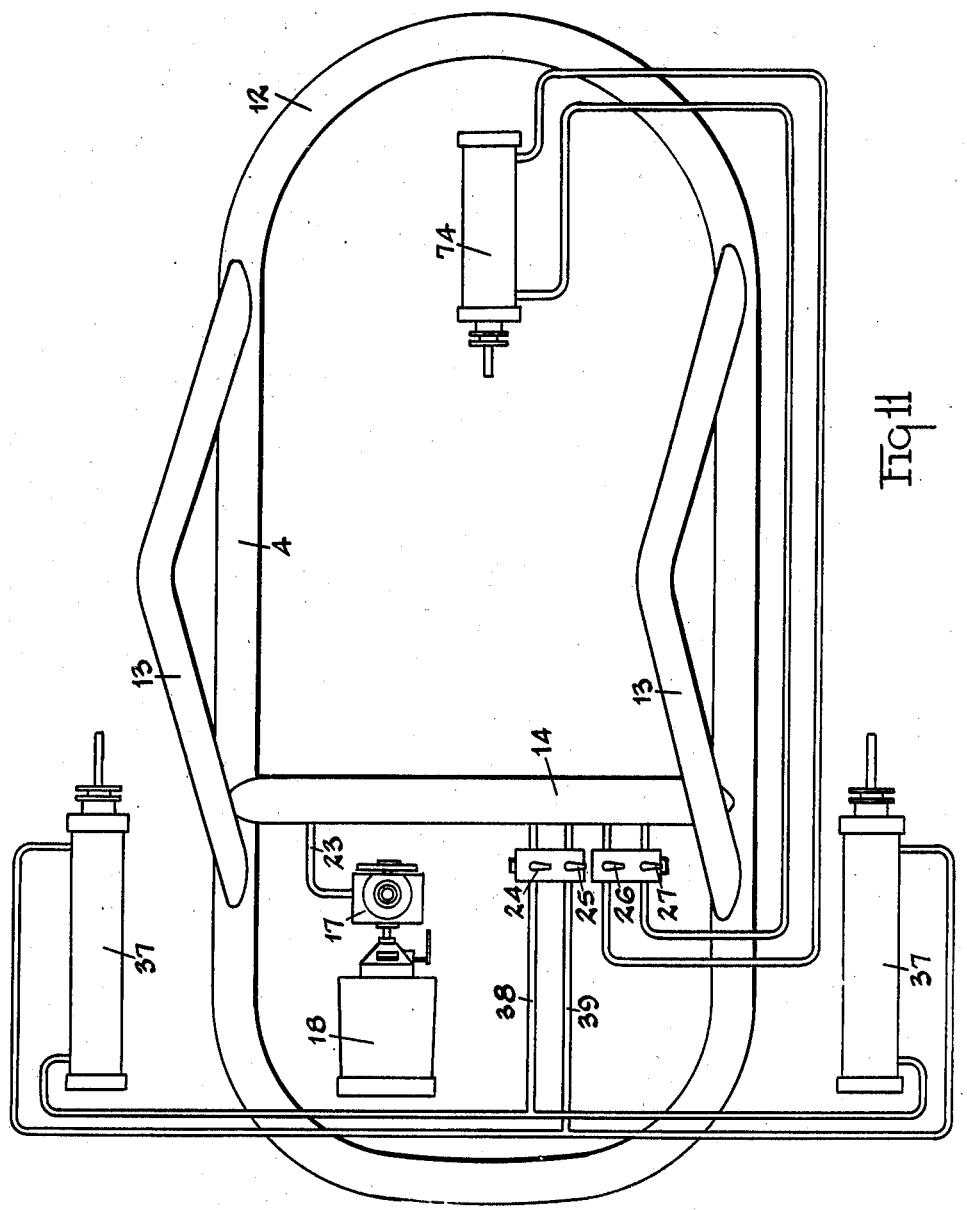

May 11, 1937. J. W. PATTERSON 2,079,695
VEHICULAR SCOOP
Filed Jan. 13, 1936 5 Sheets-Sheet 1
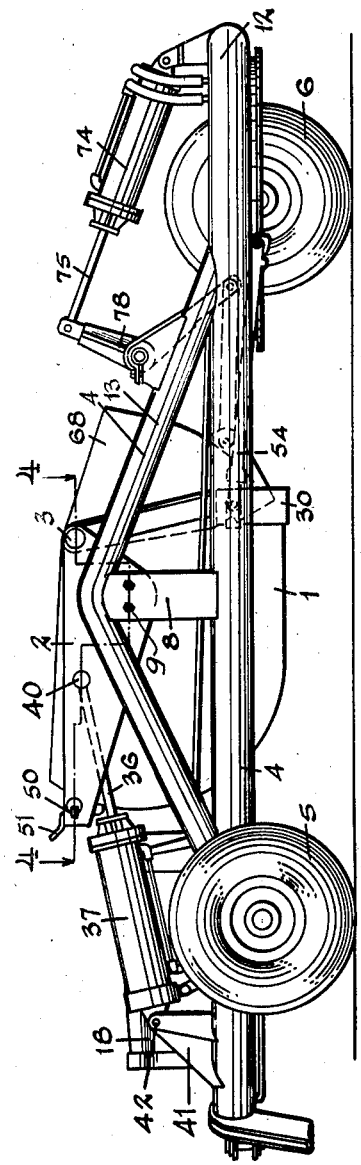
Inventor
Julius Wesley Patterson
By
Attorney

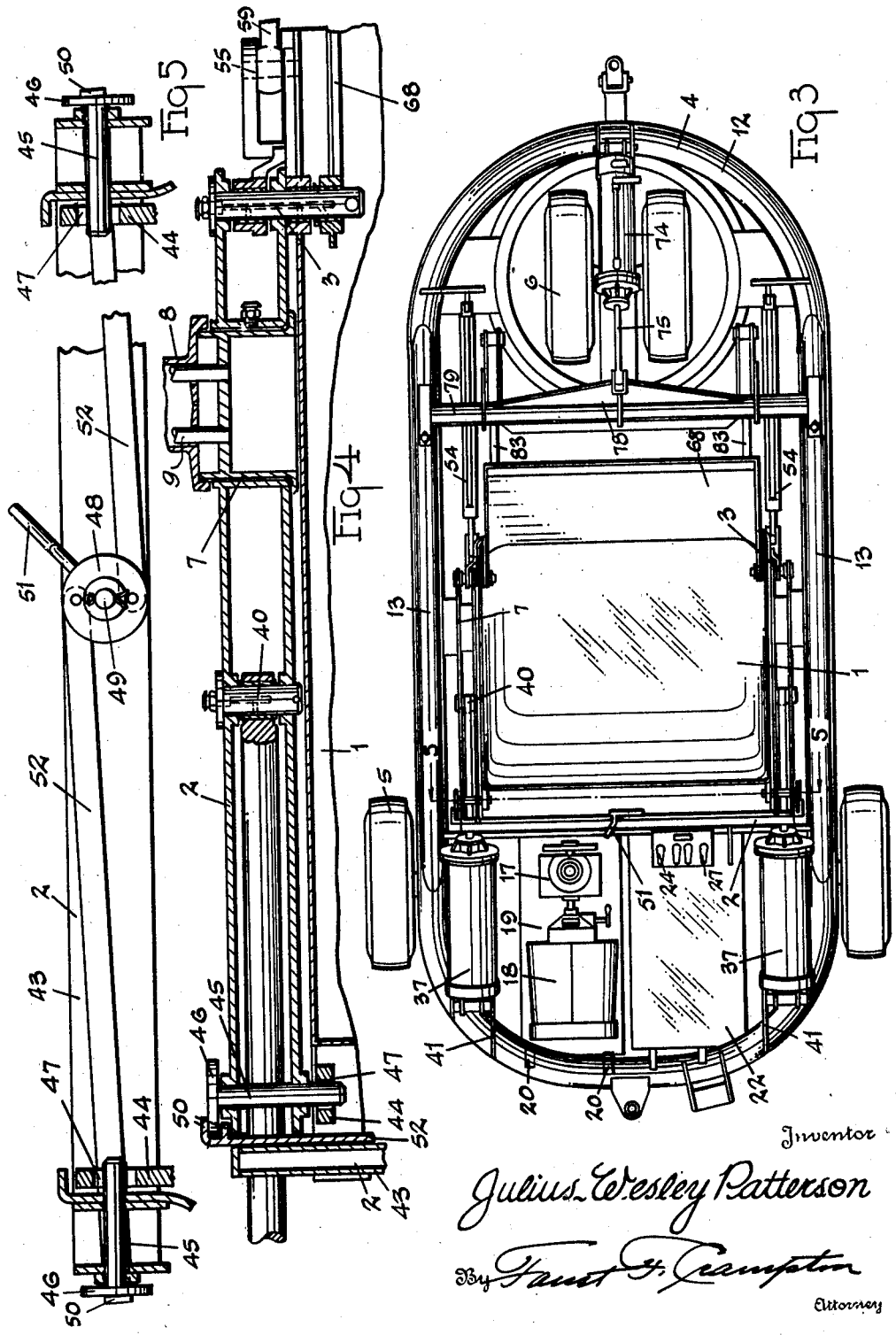

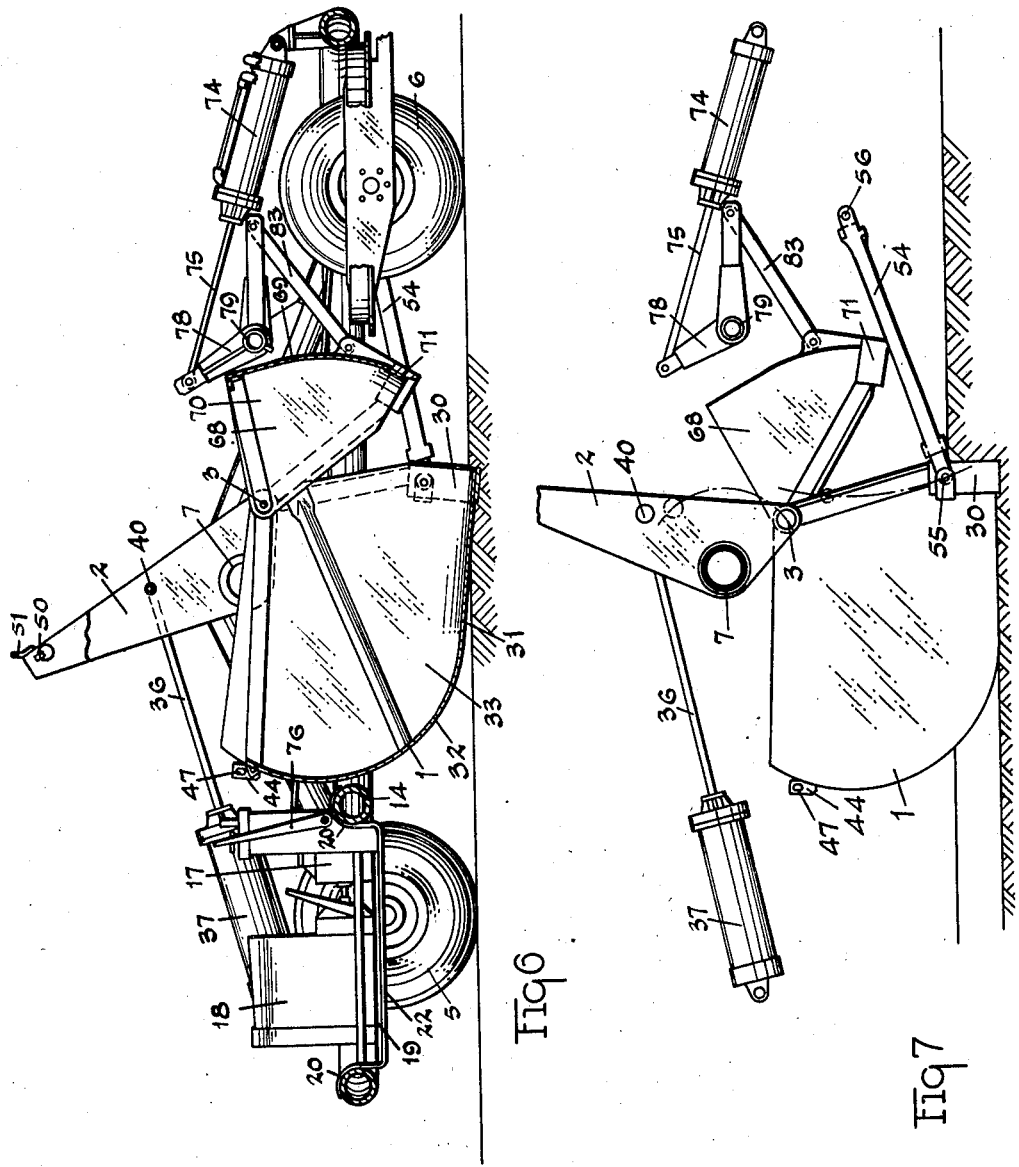

May 11, 1937.  J. W. PATTERSON  2,079,695
VEHICULAR SCOOP
Filed Jan. 13, 1936   5 Sheets-Sheet 4
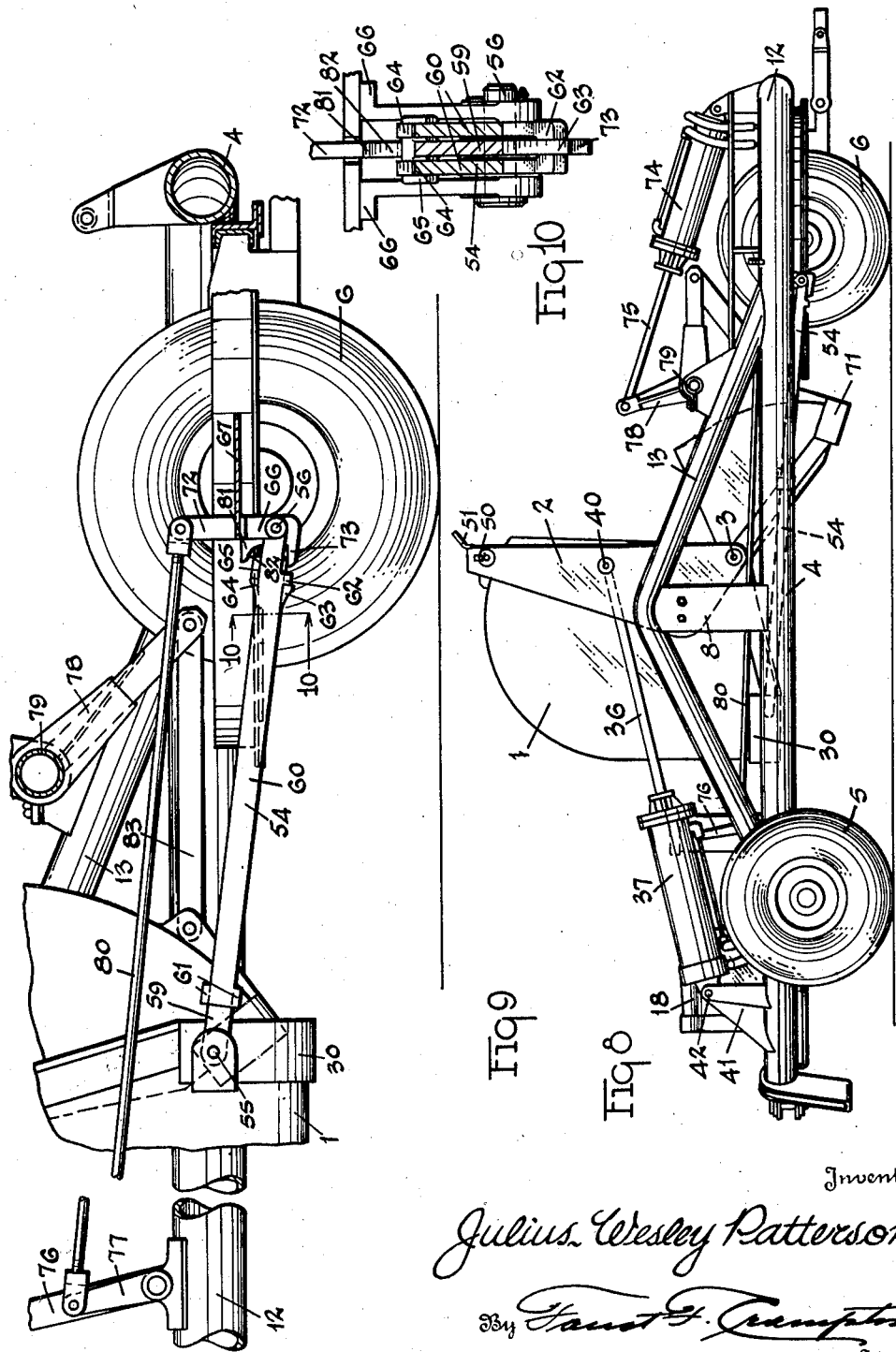
Inventor
Julius Wesley Patterson
By Faust F. Crampton
Attorney May 11, 1937.　　J. W. PATTERSON　　2,079,695
VEHICULAR SCOOP
Filed Jan. 13, 1936　　5 Sheets-Sheet 5

Inventor
Julius Wesley Patterson
By Faust F. Crampton
Attorney

Patented May 11, 1937

2,079,695

UNITED STATES PATENT OFFICE 2,079,695

VEHICULAR SCOOP

Julius Wesley Patterson, Omaha, Nebr.

Application January 13, 1936, Serial No. 58,787

11 Claims. (Cl. 37—126)

My invention has for its object to provide a vehicular scoop having a tubular frame that constitutes a reservoir for containing air under pressure and which is supplied by a suitable air pump, the tubular frame having an interior capacity sufficient to supply air at substantially a constant pressure to the scoop actuating elements, notwithstanding the pulsating pressure produced at the point of connection with the pump. A suitable engine or other motor may be provided for driving the pump. If desired, the pump may be driven by the motor that is used for driving the vehicle. Preferably a plurality of the vehicular scoops are connected together in a tandem to form a train that may be drawn by a tractor.

The invention also provides a pivoted U-bar on which the scoop bowl is pivotally supported and which is rotated to lower the scoop to dirt gathering position, to raise the scoop to load carrying position, and to rotate the scoop to dumping position.

The invention also provides for a two part draw bar that in conjunction with the U-bar, operates to locate the bottom of the scoop in progressively diminishing inclinations to the horizontal as the scoop is moved along the ground and as the scoop is lowered to its cutting depth and thereby produces easy penetration to the proper depth, and until the bottom of the scoop bowl is disposed substantially horizontal which automatically maintains the cutting edge or bar of the scoop bowl at a constant vertical depth while the scoop continues to gather material.

The invention also provides a material retaining or gathering member and means for operating the member to force the material in the scoop back into the scoop to enable gathering of additional material or by its own operation to gather material into the scoop bowl. Preferably the member is concave and constitutes a clam-like member that coacts with the scoop to gather or lift material or stone or remove obstructions.

The invention may be contained in vehicular scoops of different forms, and to illustrate a practical application of the invention I have selected a scoop containing the invention and shall describe it hereinafter. The particular structure selected is shown in the accompanying drawings.

Fig. 1 illustrates a side view of the vehicular scoop. Fig. 2 illustrates a front view of the scoop. Fig. 3 illustrates a top view of the scoop. Fig. 4 illustrates a view of a section of a supporting member taken through the pivot points of its connection with other parts of the scoop, such as along the line 4—4 indicated in Fig. 1. Fig. 5 is a view of a section taken on the plane of the line 5—5 indicated in Fig. 3. To present an enlarged view, the parts are shown broken. Fig. 6 shows the scoop partly in section when located at the point of penetration into the material during its progressive descent and forward movement. Fig. 7 illustrates the scoop at its load gathering position where it automatically maintains a desired horizontal depth beneath the surface. Fig. 8 shows the scoop in its material dumping position. Fig. 9 is an enlarged view of a part of the scoop and shows the relation of the draw bar parts and their connection with the scoop and the supporting frame. Fig. 10 is a view of a section taken on the plane of the line 10—10 shown in Fig. 9. Fig. 11 is a diagram illustrating the connections with the pneumatically operated parts of the scoop.

In the particular form of vehicular scoop illustrated in the drawings, the scoop bowl 1 is pivotally supported at its upper forward corners of the U-shaped member 2 by means of suitable pivot pins 3. The U-shaped member 2 is supported on the frame 4 of the vehicle. The vehicle is provided with balloon tired wheels 5 and 6 and may be provided with suitable hitch blocks for connecting the vehicle in a train that may be drawn by a suitable traction means.

The U-shaped member 2 is rotatably supported on cylindrical shells 7. Each shell is secured to a pair of I-bars 8 located side by side and welded along the edges of the inner flanges and to parts of the frame. Each bearing shell 7 is secured to the I-bars by means of the welded pins 9. The frame 4 of the vehicle is formed of sheet metal tubular parts of large diameter. The parts are interconnected by welding and communicate with each other to form a reservoir of considerable capacity. The frame comprises an oblong shaped tubular main frame member 12 of large diameter. The ends of the tube that forms the member 12 are welded together, and the tube is shaped to form curved frame ends. The frame also comprises side brace parts 13 that extend from the top of the main frame part 12 and are connected at their ends with the sides of the part 12 and welded thereto. Each of the brace parts 13 is bent centrally. The upper ends of the I-bars 8 are welded to the braces at their bends. The lower ends of the I-bars are welded to the main frame part 12. The frame is also provided with a cross member 14 that also communicates with the interior of the main supporting frame part 12 and is secured thereto by welding the ends of the cross parts to the main frame part 12. The summation of these tubular parts affords a reservoir of considerable volume for receiving and storing air, and by reason of its volumetric capacity, accurately controlled movements of the actuated parts may be produced.

Air pressure within the frame is raised by means of the pump 17 that may be driven by the engine 18. The air pump and the engine is supported on a suitable platform 19 that may be suspended from the rear end of the main frame part 12 and the cross part 14 by suitable hangers 20. The platform 19 may be conveniently disposed at one side of the longitudinal central axis of the frame of the machine, and a second platform 22 may be disposed beside the platform 19 for supporting the operator of the scoop. The pump 17 is connected by a suitable pipe 23 to the interior of the frame parts, and a plurality of valves 24, 25, 26, and 27 that control the supply of air under pressure from within the interior of the frame parts 12, 13, and 14 to suitable pressure actuating means that manipulate the parts of the machine, are located in convenient relation with respect to the platform 22.

The leading edge of the scoop 1 has the usual knife or cutting bar 30 having preferably upturned ends. The bar 30 is secured to and located below the lower forward edge part of the sheet metal of which the body scoop is formed. The scoop also has a flat bottom 31, an upwardly curved rear end 32, and sides 33 located at right angles to the bottom 31. The forward end is opened to allow inward movement of the dirt or material of any kind as the vehicle is drawn forward, and the rear end being curved turns the material back upon itself, as it is pushed along the bottom part and up the rear end. The curvature of the rear end ordinarily enables full loading of the scoop bowl.

The U-shaped member 2 on which the bowl is supported is formed of sheet metal parts. It is rectangular in form, and its sides are triangular in shape. The member forms a lever for manipulating the bowl. The center of the point of connection of the bowl with the member 2 is such that when the U-member is raised from substantially a horizontal position, the pivot pins 3 that support the bowl describe substantially ninety degree arcs to lower the bowl to its lowermost position.

The member 2 is operated by means of a pair of cylinders and pistons that are actuated by the pressure stored in the frame 12 of the machine. In the form shown, piston rods 36 are connected to suitable pistons that are pneumatically operated by means of the cylinders 37. The pressure in the cylinders 37 is controlled by the valves 24 and 25 located in pipes 38 and 39 that are connected to the ends of the cylinders. If desired, the valves 24 and 25 may be combined to form a single three-way valve for controlling the outlet or exhaust from one end of each cylinder as the air is admitted from the frame to the other end of the cylinder. Preferably the outlets of the valves or valve casing are formed to have a restricted exhaust or outlet passageway to prevent sudden movement of the pistons that might otherwise cause jarring of the parts of the machine actuated by the pneumatic pressures. By this arrangement, the movement of the pistons and the parts of the machine which they operate may be more easily controlled and produce the required or desired regulated movement at a minimum loss of air.

The piston rods 36 are connected by the pins 40 to the U-shaped member 2, and the cylinders 37 are pivotally connected to the brackets 41 by means of the pins 42. The brackets 41 are formed of sheet metal and welded to the main frame part 12 of the vehicle. The pipes that connect the cylinders with the valves may, at their ends, be formed of flexible tubing to permit the swinging movement of the cylinders produced by the oscillatory movement of the member 2. When the valves 24 and 25 are opened, one to admit air under pressure to the rear ends of the cylinders 37, and the other to exhaust the forward ends of the cylinder, the member 2 is swung upwardly to lower the bowl 1 towards the ground or to tilt the bowl to dump its contents.

The U-shaped member 2 is provided at the ends of its related side parts with a pair of pins 45, and the rear corners of the bowl are provided with a pair of ears 44 having openings 47 that are adapted to receive the ends of the pins 45. The pins 45 are each provided with a circular head 46, and the part 43 of the member 2 that normally extends across the rear of the bowl is provided with a pair of links 52 that extend through the side parts of the member 2. The links are eccentrically connected to a disc 48 rotatably supported on a pin 49 which is located substantially at the center of the part 43 of the member 2. Each link 52 terminates in a pair of fingers 50 located on opposite sides of the head 46 of a pin 45. The rotatable disc 48 may be provided with a suitable handle 51 which when swung ninety degrees in one direction operates to push the pins 45 out of the ears 44 and when rotated in the opposite direction operates to draw the pins inwardly, whereby the member 2 may be disconnected from or connected to the scoop bowl 1. When the member 2 is disconnected from the bowl 1, movement of the member 2 will lower or raise the bowl to or from its load gathering position. When, however, the pins interconnect the member 2 with the bowl, the bowl will be rotated with the member.

When the bowl has been loaded, the piston rods 36 are drawn inwardly into the cylinders 37 by reversal of the air flow to lift the bowl 1. The pins 45 may then be reinserted into the ears 44, and thus the bowl may be held in its load carrying position. When it is desired to dump the load, the connection from the tubular frame to the rear end of the cylinders 37 through the valve 25 is opened, and the bowl will be rotated with the member 2 about the axis of the bearing shell 7, and the contents dumped. The scoop is then returned to the normal riding position, and when it is desired to lower the bowl to gather material, the pins 45 are withdrawn from the ears 44 by the operation of the handle 51, and the valve 24 is again opened to connect the cylinders 37 with the frame 4.

To prevent rearward rotation of the bowl when gathering material, the ends of the cutting bar 30 are connected to the draw bars 54. The draw bars 54 are connected to the cutting bar 30 by the pivot pins 55 and to the frame by means of the pivot pins 56. The distances between the pivot pins 55 and 3 are materially greater than the distances between the pivot pins 3 and the axis of the bearing shell 7, while the distances between the pivot pins 55 and 56 of the draw bars 54 are considerably greater than the distances between the pivot pins 3 and 55, and when the bowl 1 is located in its load carrying position, the draw bar 54 is located in a substantially horizontal position, and the axes of the pivot pins 3 that connect the scoop bowl 1 to the member 2 are materially above the horizontal plane through the axis of rotation of the member. Consequently the curvature described by the cutting edge of the scoop as determined by the length of draw bars will be markedly less than the curvature described by the forward upward corner of the scoop as the scoop is lowered to the dirt gathering position or raised to its load carrying position, and the scoop will be tilted relative to the horizontal as it is moved from one position to the other, and the bottom of the scoop will be maintained in substantially horizontal positions when the scoop is located in either of the positions.

Each draw bar 54 is formed of two parts 59 and 60, one slidable within the other. The part 59 is located within the part 60. The part 60 consists of two side bars that are joined together by a pair of cross-pieces or lugs 61 located near the rear end of the part 60 and the cross-piece or lug 62 located at the forward end. One of the cross-pieces or lugs 61 is located above and the other is located below the part 59 and operate to guide the movement of the part 59 relative to the part 60. The cross-piece or lug 62 extends beneath the part 59. The part 59 has a depending ear 63 that engages the lug 62 formed on the part 60. The part 59 has a cross-piece or lug 65 that is welded to the part 59 and extends across the side bars of the part 60. Each of the side bars of the part 60 are provided with ears 64 that engage the cross-piece or lug 65 of the part 59. The forward edges of the ears of the parts 59 and 60 extend at right angles to the lengths of the parts of the draw bar, and the rear edges are inclined with respect to the draw bar. The forward edges of the ears 64 engage the lug 65 located at the forward end of the draw bar while the sloping edges of the ears 55 formed on the side bars of the part 60 direct the cross-piece or lug 65 over the ears 64 and into engagement with the forward edges of the ears 64 that extend at right angles to the length of the draw bar, while at the same time the depending ear 63 engages the lug 62 that extends beneath the part 59, and thus the ears and lugs are interlocked until the forward end of the part 59 is raised relative to the part 60.

In the material gathering operation, the forward ends of the parts of the draw bar 54 are interconnected so as to draw the cutting bar 30 below the surface of the material and gather the material into the bowl of the scoop. The bowl is then raised, and the scoop is conveyed to the dumping point. When the bowl is rotated to dump its contents, the forward end of the part 59 is raised relative to the part 60 in order to raise the cross-piece 65 above the ears 64, whereupon the parts 59 of the draw bar slidably move relative to the side bars of the part 60, the cross-piece 65 being drawn along the upper edges of the side bars of the part 60 as the bowl is rotated about the axis of the bearing shell 7 by rotation of the member 2. When the member 2 and the bowl 1 are caused to return by the reverse flow and pressures in the cylinder 37, the part 59 will move inwardly with respect to the part 60 until the cross-piece 65 passes over the ears 64 and is engaged thereby. At the same time the ear 63 engages the lug 62, and the parts of the draw bar 54 are interlocked. This occurs when the bowl is restored to its normal position, whereupon it is locked to the member 2 by the pins 45.

The draw bars are pivotally connected to brackets 66 that depend from plates 67 that are connected to the part 12 of the frame 4 of the vehicle. A pair of levers 72 extend upwardly through slots formed in the plates 67 and are pivoted on the pins 56. The levers 72 have fingers 73 that engage the ends of the parts 59. The levers 72 are operated by a rock lever 76 having a pair of arms 77. The arms 77 are connected to the levers 72 by the links 80 whereby the parts 59 of the draw bars may be lifted relative to the parts 60 to disengage the parts and permit rotation of the bowl. If desired, the levers 72 may be provided with ears 81 that will direct the ends of the parts 59 into locking relation when the bowl approaches its normal position from the load dumping position. The ears 81 have curved edges 82 that positively engage the cross-pieces or lugs 65 and thus force the forward ends of the parts of the draw bars 54 into locking relation.

The scoop bowl is provided with a scoop member that forms, with the scoop bowl, a clam part that coacts to gather the material. It may be used to close the open end of the bowl or to push the material into the bowl, or to dispose the material in the bowl so that additional material may be gathered by the forward movement of the vehicle. It may also be used to coact with the bowl to grip articles to lift them, such as short posts or heavy stone, or to locate articles at a point well within the bowl for disposing the load at a desired point within the bowl. It may be used to many advantages and for many purposes in connection with earth working. The coacting clam-like member 68 is pivotally connected to the bowl and preferably is located within the sides of the bowl. It is preferably formed of a sheet metal plate and is concave in form to provide space for gathered material. The member 68 has a rectangular upper edge portion and a curved end part 69 located on its forward side with respect to the vehicle and plane sides 70. The rear edge conforms in shape substantially to the shape of the forward edge part of the open end of the scoop bowl. The member 68 has a cutting bar 71 like in form to the cutting bar 30 and is located in opposed relation to the cutting bar 30. The cutting bar 71 is located exterior to the sheet metal of which the member 68 is formed and movable within the bar 30 and into the interior of the scoop bowl. The sides 70 of the member 68 are located within the side parts 33 of the scoop bowl. Preferably the member 68 is pivotally supported on the pivot pins 3 that connect the scoop bowl with the member 2, and thus the member 68 is supported on the member 2.

The coacting clam-like member 68 is operated by means of a cylinder 74 and the piston rod 75 that is connected to a suitable piston that may be reciprocated within the cylinder 74 by means of pneumatic pressures under control of the valves 26 and 27. When the valve 27 is open to connect the one end of the cylinder 74 with the frame of the vehicle, the piston rod 75 is drawn inwardly to move the cam part 68 either to close the open end of the scoop, or, if desired, to move the material within the scoop, or to cause the clamping or shearing action as between the opposed cutter bars 30 and 71, or, if desired, to gather or force material or articles into the scoop. The member 68 may be withdrawn from the scoop bowl or the end of the scoop bowl may be opened by reversing the flow of the air by the operation of the valves 26 and 27, which will force the piston rod outward.

The piston rod 75 is connected to a bell-crank lever 78 that is pivotally supported on a crossbar 79. The lever is connected to the member 68 by means of the link 83 whereby the pneumatic pressures may be transmitted to the member 68 and may be used to quite entirely fill the interior of the scoop bowl and perform many other advantageous functions.

I claim:

1. In a vehicular scoop comprising a tubular frame, a scoop bowl, a pneumatic pump carried by the frame, means for driving the pump for maintaining the supply of air under pressure within the tubular frame, a cylinder and piston, the cylinder connected at its end to the tubular frame, means for controlling the movement of the air to and from the ends of the cylinder, a member for lowering the scoop to material gathering position and raising the scoop to load carrying position and operated by the pressure produced in the cylinder, a movable plate located at the open end of the scoop, pneumatic pressure means connected to the tubular frame for operating the plate, means for controlling the pneumatic pressure to close and open the material gathering end of the scoop.

2. In a vehicular scoop comprising a tubular frame, a scoop bowl, a pneumatic pump carried by the frame, means for driving the pump for maintaining a supply of air under pressure within the tubular frame, a cylinder and piston, the cylinder connected at its end to the tubular frame, means for controlling the movement of the air to and from the ends of the cylinder, a member for lowering the scoop to material gathering position and raising the scoop to load carrying position and operated by the pressure produced in the cylinder, a material gathering plate pivotally connected to the scoop, pneumatic pressure controlled means connected to the tubular frame, means for forcing the plate against the material and closing the material gathering end of the scoop.

3. In a vehicular scoop, a member pivotally supported on the supporting frame of the vehicular scoop, a scoop bowl having an open forward end and pivotally supported on the member near the forward and upper edge of the scoop bowl and at a point on the member spaced from the axis of rotation of the member, a draw bar pivotally connected at a point near the lower forward edge of the scoop bowl, means for oscillating the member to raise and lower the scoop bowl, a material gathering plate pivotally connected to the upper forward corners of the scoop bowl, and oscillative through the open end of the scoop bowl to and from the interior of the scoop bowl, and means for forcing the plate into the scoop bowl to push gathered material inwardly into the bowl.

4. In a vehicular scoop, a member pivotally supported on the supporting frame of the vehicular scoop, a scoop bowl having an open forward end pivotally supported on the member near the forward and upper edge of the scoop bowl and at a point spaced from the axis of rotation of the member, a draw bar pivotally connected at a point near the lower forward edge of the scoop bowl and at a point more remote from the pivot point of the scoop body to the member than it is from the axis of rotation of the member, the draw bar pivotally connected to the frame at a point more remote from the point of connection of the draw bar with the bowl than the latter is from the point of connection of the scoop bowl to the member, the axes of the said pivot points of connection being located parallel, means for operating the said member to raise the scoop body to load carrying position and to lower the scoop body to load gathering position, distances between the pivot points being such as to dispose the draw bar in a substantially horizontal position when the scoop is located in a load gathering position and produce tilting movement of the scoop as it is lowered to load gathering position.

5. In a vehicular scoop, a member pivotally supported on the supporting frame of the vehicular scoop, a scoop bowl having an open forward end and pivotally supported on the member at a point spaced from the axis of rotation of the member, a draw bar connected to the lower forward edge of the scoop bowl, means for oscillating the member to raise and lower the scoop bowl, a material gathering plate and means for forcing the plate into the scoop bowl through its open end to push gathered material inwardly into the bowl and for withdrawing the plate from the scoop bowl.

6. In a vehicular scoop, a member pivotally supported on the supporting frame of the vehicular scoop, a scoop bowl having an open forward end pivotally supported on the member near the forward and upper edge of the scoop bowl and at a point on the member spaced from the axis of rotation of the member, a draw bar pivotally connected at a point near the lower forward edge of the scoop bowl, means for oscillating the member to raise and lower the scoop bowl, a concave material gathering plate pivotally connected to the upper forward corners of the scoop bowl, means for forcing the edges of the plate toward the edges of the scoop bowl and constituting with the bowl a clam-part for gathering material.

7. In a vehicular scoop, a member pivotally connected to the frame of the vehicular scoop, a scoop bowl pivotally connected to the member at one point, an engaging means operative to connect and disconnect the member to the scoop bowl at another point to prevent pivoting of the scoop bowl relative to the member and to release the scoop bowl from the member, a draw bar having relatively slidable parts, one of said parts pivotally connected at a point near the lower forward edge of the scoop bowl, the other of the said parts pivotally connected to the frame of the machine, a second engaging means operative to interconnect and disconnect the said parts, means for operating the member to lower the scoop bowl and for raising the scoop bowl when the first named engaging means is disconnected from the scoop bowl, and operative to rotate the scoop bowl when the first named engaging means connects the scoop bowl and the member and the second named engaging means disconnects its associated parts.

8. In a vehicular scoop, a member pivotally connected to the frame of the vehicular scoop, a scoop bowl pivotally connected to the member at a point spaced from the axis of the pivotal support of the member and engaging means operative to connect and disconnect the member to the scoop bowl at a point remote from the pivotal connection of the bowl through the member to prevent pivoting of the scoop bowl relative to the member and to release the scoop bowl from the member, a draw bar having relatively slidable parts, each of the parts of the draw bar having interengaging lugs for connecting the parts together to prevent sliding movements of one relative to the other, and means for disengaging the lugs for permitting sliding movement of the parts of the draw bar relative to each other, one of the parts pivotally connected at a point near the lower forward edge of the scoop bowl, the other of the said parts connected to the frame of the machine, means for operating the member to lower the scoop bowl and for raising the scoop bowl when the first named engaging means is disconnected from the scoop bowl and operative to rotate the scoop bowl when the first named engaging means connects the scoop bowl and the member and the said lugs are disengaged.

9. In a vehicular scoop, a member pivotally connected to the frame of the vehicular scoop, a scoop bowl pivotally connected to the member at one point, an engaging means for connecting and disconnecting the member to the scoop bowl at a point remote from the pivoted connection of the bowl to the member to prevent pivoting of the scoop bowl relative to the member and to release the scoop bowl from the member, a draw bar pivotally connected at a point near the lower forward edge of the scoop bowl and to the frame of the machine, means for operating the member to lower the scoop bowl when the engaging means is disconnected from the scoop bowl and for raising the scoop bowl and operative to rotate the scoop bowl when the engaging means interconnects the scoop bowl with the member.

10. In a vehicular scoop, a scoop bowl having an open forward edge, a U-shaped member pivotally connected to the frame of the vehicular scoop and extending around the sides and the rear of the scoop bowl, the scoop bowl pivotally connected to the member at its upper forward corners, an engaging means for interconnecting the scoop bowl to the member at a point remote from the pivotal point of connection of the scoop bowl to the member and for disconnecting the said member and the scoop bowl, a telescopic draw bar pivotally connected at a point near the lower forward edge of the scoop bowl and to the frame of the machine, and having latch means for automatically connecting the telescoping parts when the draw bar is shortened, means for operating the latch to disconnect the said parts to permit sliding movement of the telescoping parts relative to each other, means for limiting the outward telescopic movements of the draw bar, means for operating the member to lower the scoop bowl and for raising the scoop bowl when the engaging means is disconnected from the scoop bowl and operative to rotate the scoop bowl when the engaging means and the latch means are disconnected.

11. In a vehicular scoop, a scoop bowl having an open forward end and a substantially rectangular upper edge, a U-member pivotally connected to the frame of the vehicular scoop and extending along the sides and the rear end of the scoop and located exterior to the scoop, means for pivotally connecting the ends of the member to the upper forward corners of the scoop, an engaging means for connecting the corners of the member to the rear corners of the scoop, means located centrally with respect to the part of the member extending across the rear of the scoop for operating the engaging means, means for operating the member to raise and lower the scoop bowl when the engaging means disconnects the member from the scoop bowl, and for rotating the scoop bowl when the interengaging means interconnects the member to the scoop bowl.

JULIUS WESLEY PATTERSON.